United States Patent [19]

Meyn

[11] Patent Number: 5,269,721
[45] Date of Patent: Dec. 14, 1993

[54] METHOD AND APPARATUS FOR PROCESSING POULTRY

[75] Inventor: Cornelis Meyn, Oostzaan, Netherlands

[73] Assignee: Machinefabriek Meyn B.V., Oostzaan, Netherlands

[21] Appl. No.: 938,000

[22] Filed: Aug. 28, 1992

[30] Foreign Application Priority Data

Sep. 3, 1991 [NL] Netherlands ................ 91 01484

[51] Int. Cl.$^5$ ............................................. A22C 21/06
[52] U.S. Cl. ..................................... 452/117; 452/182
[58] Field of Search ................ 452/117, 106, 118, 182

[56] References Cited

U.S. PATENT DOCUMENTS

| | | | |
|---|---|---|---|
| Re. 32,402 | 4/1987 | Graham et al. | ...... 452/117 |
| 3,474,492 | 10/1969 | Viscolosi . | |
| 3,663,991 | 5/1972 | Harben, Jr. . | |
| 4,178,659 | 12/1979 | Simonds | ...... 452/182 |
| 4,467,498 | 8/1984 | Graham et al. . | |
| 4,546,520 | 10/1985 | Wenzel et al. | ...... 452/117 |
| 5,026,317 | 6/1991 | Kennedy . | |
| 5,041,053 | 8/1991 | Ellis et al. . | |

FOREIGN PATENT DOCUMENTS

| | | | |
|---|---|---|---|
| 503752 | 10/1952 | Belgium | ...... 452/117 |
| 813138 | 7/1974 | Belgium . | |
| 225306 | 6/1987 | European Pat. Off. | ...... 452/182 |
| 533649 | 2/1941 | United Kingdom | ...... 452/117 |
| 1378411 | 12/1974 | United Kingdom . | |

*Primary Examiner*—Willis Little
*Attorney, Agent, or Firm*—Dority & Manning

[57] ABSTRACT

The invention comprises a method of processing poultry carcasses of removing and separating the entrails from the abdominal cavities of the carcasses. The separated entrails are moved on an inspection conveyor which is spaced from the suspension conveyor which conveys the carcasses and which moves synchronously with the suspension conveyor, so that the entrails and the carcasses move past an inspection station at the same time. The invention includes apparatus for carrying out the method.

10 Claims, 1 Drawing Sheet

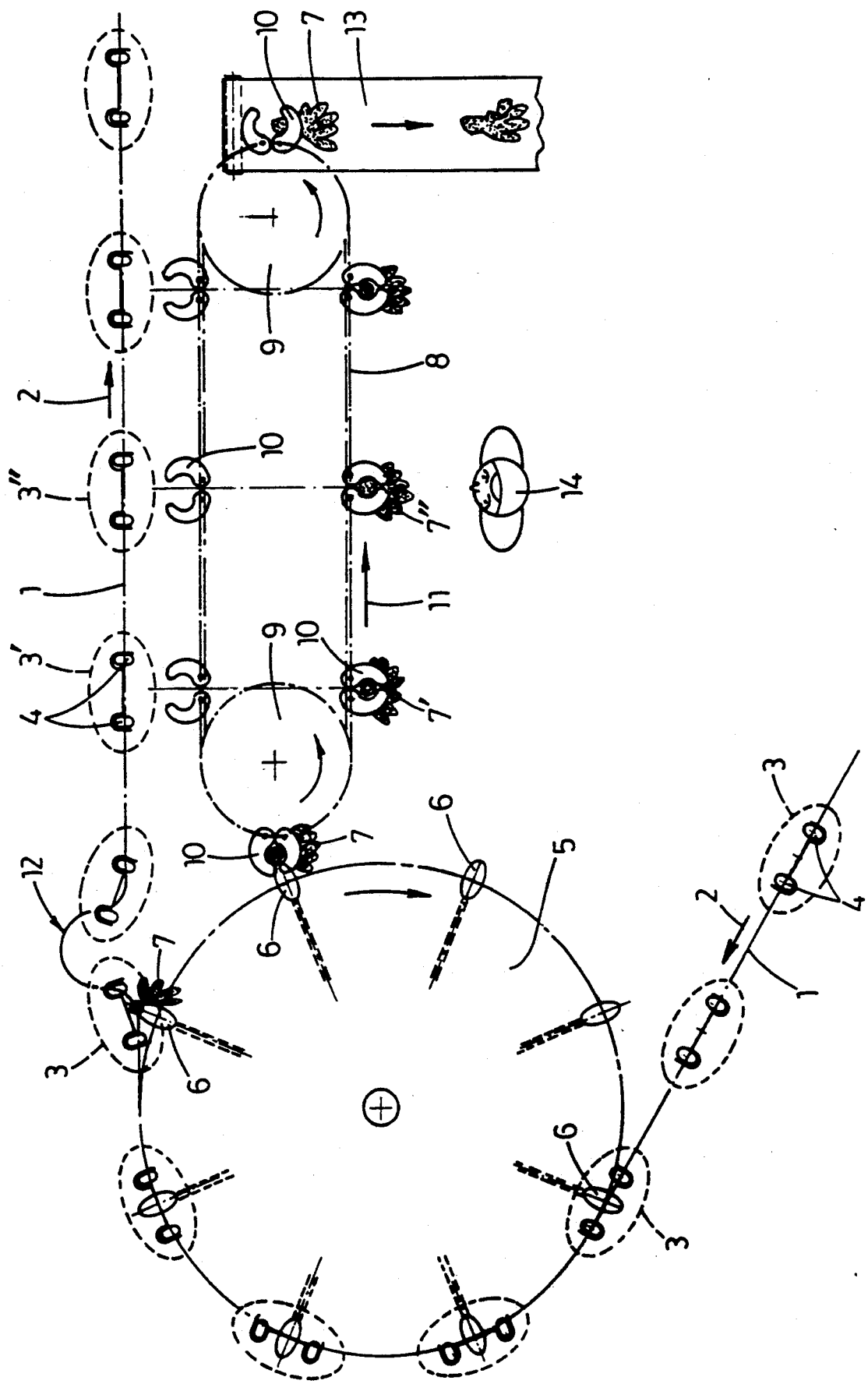

METHOD AND APPARATUS FOR PROCESSING POULTRY

BACKGROUND OF THE INVENTION

The invention relates to a method for processing poultry, which is suspended by its legs from a suspension conveyor, wherein the entrails are removed from the abdominal cavity of the poultry.

In a known method the entrails, which are still connected with the bird after being removed from the abdominal cavity of the poultry, are suspended over the back of the poultry. A veterinary inspector may now inspect the entrails and decide whether the poultry is fit for consumption. The determination of irregularities in an entrails package leads to rejection of the respective bird and removing it from the suspension conveyor.

A disadvantage of this known method is that there is a risk that the entrails, especially excrements leaving the intestines, contaminate the outside of the respective bird, which is undesirable.

SUMMARY OF THE INVENTION

It is an object of the invention to provide a method of the type referred to above in which this disadvantage is eliminated in a simple, but nevertheless effective way.

The method according to the invention is characterized in that the entrails are separated from the poultry and are moved synchronously therewith over some distance.

Because the entrails are separated from the poultry carcass and, at the most, are connected therewith only through a layer of fat, no contact occurs between the entrails, after being removed from the abdominal cavity of the poultry, and the outside of the poultry. Thus, the risk of a possible contamination is neatly reduced. For enabling a reliable inspection of the poultry, starting from the quality of the entrails, in accordance with the method of the invention, care has been taken that the entrails are moved synchronously with the poultry over some distance. Preferably, the entrails are completely loosened from the poultry. Now, no connection whatsoever occurs between the entrails and the poultry, such that the risk of contamination has entirely vanished. Resulting from the synchronous movement, a veterinary inspector, judging the quality of the entrails, can determine unambiguously which bird belongs to which entrails.

The invention further relates to an apparatus for carrying out the method according to the invention. The invention comprises means for removing the entrails from the abdominal cavity of the poultry. Such means for removing the entrails from the abdominal cavity of the poultry are known per se and do not need any further elucidation.

The apparatus according to the invention is characterized by a conveyor for conveying the entrails synchronously with the poultry along part of its track. In this respect the entrails may or may not be still connected to the poultry through a layer of fat or the like.

Preferably this part of the conveyor for the entrails follows a track positioned along side the poultry. In this way the distance between the poultry and the entrails is minimal, so that the risk is minimal that an entrails package is allotted to the wrong bird, when the entrails are loosened from the poultry.

Further, according to one embodiment of the apparatus, according to the invention, the conveyor comprises an endless conveyor, such as a chain conveyor. The conveyor follows an elongated substantially horizontal track, and the conveyor carries a number of transportation means for receiving respective entrails packages. Such an embodiment offers a constructively simple embodiment; however, an extremely effective operation.

Further, it is advantageous, if the direction of progression of the conveyor is such that the entrail transportation means move synchronously with the poultry at the conveyor part distanced most from the poultry. From the viewpoint of a veterinary inspector, who stands at that side of the poultry conveyed by the suspension conveyor, the conveyor is positioned where the entrails are at the frontal side of the conveyor. So, the entrails are optimally visible thus simplifying the inspection thereof.

Finally, in another embodiment, the transportation means comprise gripping means movable between an opened and a closed position. In the opened position the gripping means can take over the entrails from the means which have removed the entrails from the abdominal cavity of the bird. Next, in the closed position the entrails are moved synchronously with the poultry.

BRIEF DESCRIPTION OF THE DRAWINGS

Hereinafter, the invention will be elucidated further referring to the one and only figure, in a schematic top plan view of an embodiment of the apparatus, according to the invention, is represented.

DETAILED DESCRIPTION OF THE INVENTION

In the FIGURE a striped and dotted line 1 represents a suspension conveyor progressing in the direction of arrow 2. Birds carcasses 3 to be processed (shown schematically in dotted lines) are, in a way known per se, are suspended by their legs 4 from the suspension conveyor i. The suspension conveyor 1 passes a rotating processing apparatus 5 which carries out at regularly spaced intervals about its circumference means 6, known per se, for removing the entrails from the abdominal cavity of the bird. The operation of such a processing apparatus 5, comprising means 6 is known per se and does not need any further elucidation within the scope of the present invention. It is noted only that in the present invention the birds 3 are subjected to the required processing while passing through the processing apparatus 5, wherein the entrails 7 are removed from the abdominal cavity and are completely loosened from the birds.

As seen in the conveying direction of the suspension conveyor 1, behind the processing apparatus 5 and along side the suspension conveyor 1, a further conveyor 8 is positioned for the entrails 7, removed from the birds 3. In the illustrated embodiment this conveyor comprises an endless chain 8 running around two reversal wheels or sprockets 9. Of course, other conveyors are conceivable too, such as belt conveyor or the like. The chain 8 comprises a number of transportation means to for receiving the respective entrails packages 7, in the illustrated embodiment shaped as gripping means 10.

The direction of progression of the chain conveyor 8 is indicated by arrow 11.

The entrails 7 removed from the birds 3, using the means 6 of the processing apparatus 5, are conveyed along by these means 6 until the gripping means 10 of the chain conveyor 8 take over the entrails 7 from the means 6. Next, the entrails 7 are taken along by the chain conveyor 8. The transportation velocity of the chain conveyor 8 equals the transportation velocity of the suspension conveyor 1, so that the entrails 7 move along synchronously with the respective birds 3 at the part of the chain conveyor 8, furthest from the birds 3. To take care that the entrails 7 are precisely synchronized with the respective bird 3 (such as entrails 7' and bird 3' or entrails 7" and 3") the suspension conveyor 1 runs through some curves 12 or the like.

The gripping means 10 are movable between opened and closed positions. The movement from the opened position towards the closed position occurs at the moment where the gripping means 10 and a processing means 6 of the processing apparatus 5, carrying an entrails package 7, are in proximity and the respective entrails package 7 has to be gripped by the gripping means 10. After the gripping means 10 and entrails package 7 have passed the adjacent straight section of the chain conveyor 8 the gripping means 10 may be opened and the entrails 7 may be supplied to a discharge chute 13 or alike. In the opened position the gripping means 10 next are returned to the processing apparatus 5.

Alongside of the chain conveyor 8 a veterinary inspector 14 stands, who checks whether the passing entrails 7 contain irregularities. Since the entrails, as seen from the position of the inspector 14, are at the frontal side of the chain conveyor 8 they are optimally visible. Further, no discussion is possible about the question as to which birds 3 the respective entrails packages 7 belong, since the entrails 7 and birds 3 are moved synchronously.

The invention is not restricted to the embodiment described before, which, within the scope of the invention, may be varied widely. The conveyor 8 may also be fit for conveying entrails which are still connected with the birds through a layer of fat, but which do not further contact the birds.

I claim:

1. A method for processing poultry carcasses, comprising the following steps:
   (a) suspending poultry carcasses from a suspension conveyor at spaced intervals;
   (b) conveying said carcasses through a processing station;
   (c) removing the entrails from abdominal cavities of said carcasses as said carcasses are conveyed through said processing station;
   (d) at least partially separating said entrails from said carcasses and transferring said entrails to an inspection conveyor which extends parallel to a portion of said suspension conveyor, and conveys said entrails past an inspection station;
   (e) synchronizing the velocities of said suspension conveyor and said inspection conveyor so that the carcass and the entrails which were removed therefrom pass the inspection station at the same time; and
   (f) removing said entrails from said inspection conveyor after they pass said inspection station.

2. A method for processing poultry carcasses as set forth in claim 1, further comprising the step of completely separating said entrails from said carcasses before they pass said inspection station.

3. A method for processing poultry carcasses as set forth in claim 1, further comprising the step of separating said entrails from said carcasses at said processing station and transferring them to gripping means on said inspection conveyor.

4. An apparatus for processing poultry carcasses, comprising:
   (a) a suspension conveyor for conveying said carcasses suspended therefrom at spaced intervals;
   (b) a processing station disposed along a portion of said suspension conveyor, having means for removing the entrails from the abdominal cavities of said carcasses as said carcasses are conveyed by said suspension conveyor;
   (c) an inspection conveyor disposed at a predetermined distance from a portion of said suspension conveyor and extending substantially parallel thereto for receiving and conveying entrails along an inspection path;
   (d) means for at least partially separating said entrails from said carcasses and for transferring said entrails to said inspection conveyor;
   (e) an inspection station disposed alongside said inspection conveyor, permitting a visual inspection of said entrails and said carcasses as they are conveyed by said inspection conveyor and said suspension conveyor, respectively;
   (f) control means for synchronizing the velocities of said conveyors so that the carcass and the entrails removed therefrom pass said inspection station at the same time; and
   (g) means for receiving separated entrails from said inspection conveyor.

5. An apparatus for processing poultry carcasses as set forth in claim 4, wherein said suspension conveyor is an endless chain conveyor.

6. An apparatus for processing poultry carcasses as set forth in claim 4, wherein said inspection conveyor is substantially horizontal where it passes said inspection station.

7. An apparatus for processing poultry carcasses as set forth in claim 4, wherein said inspection conveyor has a plurality of holding means for holding a plurality of entrails packages.

8. An apparatus for processing poultry carcasses as set forth in claim 7, wherein said holding means comprises gripping means, movable between opened and closed positions for receiving and gripping entrails packets.

9. An apparatus for processing poultry carcasses as set forth in claim 8, wherein said holding means comprises means for opening said gripping means to receive entrails packets and for closing said gripping means for gripping and holding said entrails packets as they are conveyed by said inspection conveyor.

10. An apparatus for processing poultry carcasses as set forth in claim 4, comprising means to completely separate said entrails from said carcasses as they are transferred to inspection conveyor.

* * * * *

REEXAMINATION CERTIFICATE (3381st)

United States Patent [19]

Meyn

[11] B1 5,269,721

[45] Certificate Issued Nov. 18, 1997

[54] METHOD AND APPARATUS FOR PROCESSING POULTRY

[75] Inventor: Cornelis Meyn, Oostzaan, Netherlands

[73] Assignee: Machinefabriek Meyn B.V., Oostzaan, Netherlands

Reexamination Requests:
No. 90/004,115, Jan. 31, 1996
No. 90/004,263, Jun. 4, 1996
No. 90/004,609, Apr. 23, 1997

Reexamination Certificate for:
Patent No.: 5,269,721
Issued: Dec. 14, 1993
Appl. No.: 938,000
Filed: Aug. 28, 1992

[30] Foreign Application Priority Data

Sep. 3, 1991 [NL] Netherlands ............... 91 01484

[51] Int. Cl.$^6$ ................................. A22C 21/06
[52] U.S. Cl. ............................ 452/117; 452/182
[58] Field of Search ........................ 452/117, 106, 452/118, 182

[56] References Cited

U.S. PATENT DOCUMENTS

| | | |
|---|---|---|
| Re. 16,079 | 5/1925 | Lundell . |
| Re. 32,402 | 4/1987 | Graham et al. . |
| D. 286,884 | 11/1986 | Conner et al. ............ D15/139 |
| 1,316,626 | 9/1919 | Lundell . |
| 1,326,905 | 1/1920 | Birch . |
| 1,413,673 | 4/1922 | Lundell . |
| 1,445,632 | 2/1923 | Lundell . |
| 1,531,060 | 3/1925 | Allbright . |
| 1,537,846 | 5/1925 | McKenzie . |
| 2,492,387 | 12/1949 | Lundell . |
| 2,817,874 | 12/1957 | Conaway . |
| 2,923,028 | 2/1960 | Lundell . |
| 3,162,892 | 12/1964 | Fox . |

(List continued on next page.)

FOREIGN PATENT DOCUMENTS

| | | |
|---|---|---|
| 503752 | 10/1952 | Belgium . |
| 813138 | 7/1974 | Belgium . |
| 205946 | 9/1920 | Canada . |
| 656485 | 1/1963 | Canada . |
| 1200661 | 2/1986 | Canada . |
| 0-225306 | 10/1987 | European Pat. Off. . |
| 487075A1 | 5/1992 | European Pat. Off. . |
| 538943B1 | 11/1995 | European Pat. Off. . |
| 1253928 | 1/1961 | France . |
| 465465 | 8/1928 | Germany . |
| 224414 | 7/1963 | Germany . |
| 8801970 | 3/1990 | Netherlands . |
| 30332 | 2/1904 | Switzerland . |
| 322169 | 11/1971 | U.S.S.R. . |
| 533649 | 2/1941 | United Kingdom . |
| 1507002 | 4/1974 | United Kingdom . |
| 1378411 | 12/1974 | United Kingdom . |
| 1403635 | 8/1975 | United Kingdom . |
| 1462704 | 1/1977 | United Kingdom . |

OTHER PUBLICATIONS

Clarence Dawson, "Hands-off" inspection; The answer to Booz Allen report?. Poultry Processing & Marketing (Oct. 1977).

Donald L. Houston and V.H. Barry, Final Report—Alternative Poultry Inspection on Young Chicks at Three Processing Plants—Two in Arkansas and One in Louisiana: An Effectiveness Study. (1978 and Jun. 1979).

(List continued on next page.)

*Primary Examiner*—Willis Little

[57] ABSTRACT

The invention comprises a method of processing poultry carcasses of removing and separating the entrails from the abdominal cavities of the carcasses. The separated entrails are moved on an inspection conveyor which is spaced from the suspension conveyor which conveys the carcasses and which moves synchronously with the suspension conveyor, so that the entrails and the carcasses move past an inspection station at the same time. The invention includes apparatus for carrying out the method.

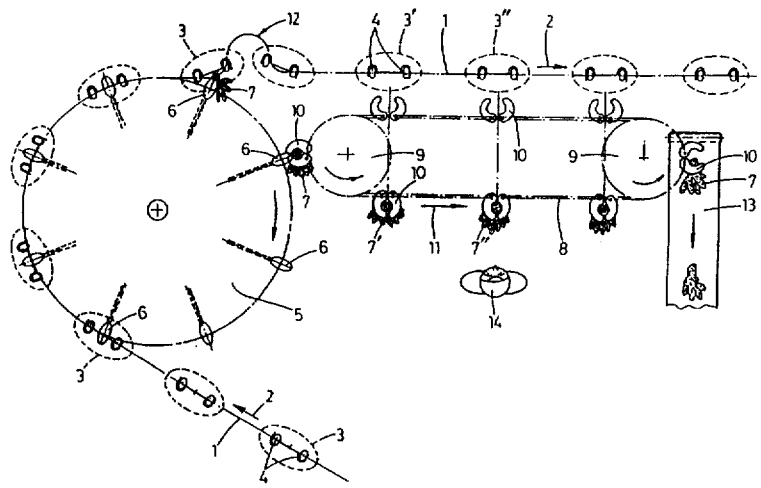

U.S. PATENT DOCUMENTS

| | | |
|---|---|---|
| 3,474,492 | 10/1969 | Viscolosi . |
| 3,555,593 | 1/1971 | Scheier . |
| 3,653,093 | 4/1972 | Scheier . |
| 3,663,991 | 5/1972 | Harben, Jr. . |
| 3,685,097 | 8/1972 | Scott et al. . |
| 3,750,231 | 8/1973 | Schreuder . |
| 3,837,699 | 9/1974 | Anderson et al. . |
| 3,879,803 | 4/1975 | Verbakel . |
| 3,983,601 | 10/1976 | Verbakel . |
| 4,178,659 | 12/1979 | Simonds . |
| 4,382,313 | 5/1983 | Harben, Jr. et al. . |
| 4,423,808 | 1/1984 | Venturelli . |
| 4,467,498 | 8/1984 | Graham et al. . |
| 4,538,325 | 9/1985 | Harben, Jr. et al. . |
| 4,546,520 | 10/1985 | Wenzel et al. . |
| 4,561,148 | 12/1985 | Bonuchi et al. . |
| 4,574,428 | 3/1986 | Meyn . |
| 4,724,581 | 2/1988 | van de Nieuwelaar . |
| 4,958,408 | 9/1990 | Meyn . |
| 4,982,834 | 1/1991 | Jacobsen . |
| 5,026,317 | 6/1991 | Kennedy . |
| 5,041,053 | 8/1991 | Ellis et al. ............ 452/106 |
| 5,062,820 | 11/1991 | Rankin et al. .......... 452/187 |
| 5,098,333 | 3/1992 | Cobb ................... 452/106 |
| 5,277,650 | 1/1994 | Meyn .................. 452/182 |

OTHER PUBLICATIONS

David Amey, Hands Off Inspection proving Processor's Utopia, Poultry Processing & Marketing (Jan. 1978).

Dr. John Gray, "Total 'hands off' inspection nears," Broiler Industry, 66–69 (Jan. 1981).

Letter from Douglas Berndt to Bartie Woods, Standards for one Approval Hands–Off/Hands–On Sequenced Inspection Methods, Apr. 27, 1982.

David Amey, MFC's "hands–off" inspection cuts labor, increases yield. Broiler Industry, (Jan. 1978).

U.S. Department of Agriculture, Sequenced Inspection. MPI Bulletin 78–48. (Apr. 19, 1978).

Letter from D. Houston to Wallace Thacker of Wayne Poultry. (Sep. 30, 1981).

DL Houston to Berry with letter from Wallace Thacker at Wayne Poultry. (Sep. 9, 1981).

Poultry Inspection—The Basis for a Risk–Assessment Approach—1987, prepared by the Committee on Public Health risk Assessment of Poultry Inspection Programs.

National Academy of Science Reports, Developing a risk–Based Poultry Inspection System, (Aug. 1988).

Brochure—Meyn Machanefabrick B.V. Maestro Eisceration System.

U.S. Department of Agriculture Report prepared by Muhammad Z. Hussain, D.V.M., M.S.A. Test of the effectiveness of a Four–Inspector Hands–Off/Hands–On Sequenced Inspection Procedure. (Feb. 1982).

Clarence Dawson, "'Hands Off' Inspection", Broiler Industry (Oct. 1977)(S 05416–S 05418).

Stork Poultry Brochure, "Automatic Package remover" (Apr. 1990)(S 05419–S 05421).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4–9 is confirmed.

Claims 1 and 2 are cancelled.

Claims 3 and 10 are determined to be patentable as amended.

New claims 11-15 are added and determined to be patentable.

3. A method for processing poultry carcasses [as set forth in claim 1, further comprising the step of] *comprising the following steps:*
   (a) *suspending poultry carcasses from a suspension conveyor at spaced intervals;*
   (b) *conveying said carcasses through a processing station;*
   (c) *removing the entrails from abdominal cavities of said carcasses as said carcasses are conveyed through said processing station;*
   (d) *in an automated process at least partially separating said entrails from said carcasses without hanging said entrails on said carcasses and transferring said entrails to an inspection conveyor which extends parallel to a portion of said suspension conveyor, and conveys said entrails past an inspection station;*
   (e) *synchronizing the velocities of said suspension conveyor and said inspection conveyor to that the carcass and the entrails which were removed therefrom pass the inspection station at the same time;*
   (f) *removing said entrails from said inspection conveyor after they pass said inspection station, and*
   (g) *wherein step (d) further comprises* separating said entrails from said carcasses at said processing station and transferring them to gripping means on said inspection conveyor.

10. An apparatus for processing poultry carcasses [as set forth in claim 4], comprising [means to]:
    (a) *a* suspension conveyor for conveying said carcasses suspended therefrom at spaced intervals;
    (b) *a* processing station disposed along a portion of said suspension conveyor, having means for removing the entrails from the abdominal cavities of said carcasses as said carcasses are conveyed by said suspension conveyor;
    (c) *an* inspection conveyor disposed at a predetermined distance from a portion of said suspension conveyor and extending substantially parallel thereto for receiving and conveying entrails along an inspection path;
    (d) means for at least partially separating said entrails from said carcasses at said processing station and for completely [separate] *separating* said entrails from said carcasses as they are *automatically* transferred to *said* inspection conveyor;
    (e) *an* inspection station disposed alongside said inspection conveyor *and a portion of said suspenson conveyor, permitting a visual inspection of said entrails and said carcasses as they are conveyed by said inspection conveyor and said suspension conveyor, respectively;*
    (f) *control means for synchronizing the velocities of said conveyors so that the carcass and the entrails removed therefrom pass said inspection station at the same time; and*
    (g) means for receiving separated entrails from said inspection conveyor.

11. *A method for processing poultry carcasses, comprising the following steps:*
    (a) *suspending poultry carcasses from a suspension conveyor at spaced intervals;*
    (b) *conveying said carcasses through a processing station;*
    (c) *removing the entrails from abdominal cavities of said carcasses as said carcasses are conveyed through said processing station;*
    (d) *automatically separating said entrails from said carcasses so that said entrails do not hang on the outside of said carcasses and automatically transferring said entrails to an inspection conveyor which extends parallel to a portion of said suspension conveyor, and conveys said entrails past an inspection station;*
    (e) *synchronizing the velocities of said suspension conveyor and said inspection conveyor to that the carcass and the entrails which were removed therefrom pass the inspection station at the same time;*
    (f) *simultaneously inspecting said entrails and said carcasses of the same poultry with a single iinspector at said inspection station; and*
    (g) *removing said entrails from said inspection conveyor after they pass said inspection station.*

12. *An apparatus for processing poultry carcasses, comprising:*
    (a) *a suspension conveyor for conveying said carcasses suspended therefrom at spaced intervals;*
    (b) *a processing station disposed along a portion of said suspension conveyor, having means for removing the entrails from the abdominal cavities of said carcasses as said carcasses are conveyed by said suspension conveyor;*
    (c) *an inspection conveyor disposed at a predetermined distance from a portion of said suspension conveyor and extending substantially parallel thereto for receiving and conveying entrails along an inspection path;*
    (d) *means for at least partially separating said entrails from said carcasses at said processing station and for automatically transferring said entrails from said processing station to said inspection conveyor wherein said entrails do not hang on the outside of said carcasses;*

(e) an inspection station disposed alongside said inspection conveyor and a portion of said suspenson conveyor, permitting a simultaneous visual inspection of said entrails and said carcasses as they are conveyed by said inspection conveyor and said suspension conveyor, respectively;

(f) control means for synchronizing the velocities of said conveyors so that the carcass and the entrails removed therefrom pass said inspection station at the same time; and (g) means for receiving separated entrails from said inspection conveyor.

13. The method as set forth in claim 3 wherein the entrails are completely separated from said carcasses while being conveyed through said processing station prior to being transferred to said inspection conveyor.

14. The apparatus as set forth in claim 4 wherein said inspection conveyor further comprises a pair of space wheels, and an endless chain running around said pair of space wheels.

15. The apparatus is set forth in claim 4 wherein said inspection conveyor is a belt conveyor.

* * * * *